(12) United States Patent
Itamochi

(10) Patent No.: US 10,790,092 B2
(45) Date of Patent: Sep. 29, 2020

(54) MULTILAYER CERAMIC ELECTRONIC COMPONENT

(71) Applicant: Murata Manufacturing Co., Ltd., Nagaokakyo-shi, Kyoto-fu (JP)

(72) Inventor: Masakazu Itamochi, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 68 days.

(21) Appl. No.: 15/986,925

(22) Filed: May 23, 2018

(65) Prior Publication Data

US 2018/0350524 A1 Dec. 6, 2018

(30) Foreign Application Priority Data

May 30, 2017 (JP) .................. 2017-107055

(51) Int. Cl.

| H01G 4/38 | (2006.01) |
|---|---|
| H01G 4/30 | (2006.01) |
| H01G 4/248 | (2006.01) |
| H01G 2/06 | (2006.01) |
| H01G 4/232 | (2006.01) |
| H01G 4/12 | (2006.01) |

(52) U.S. Cl.
CPC .............. *H01G 4/38* (2013.01); *H01G 2/06* (2013.01); *H01G 4/232* (2013.01); *H01G 4/2325* (2013.01); *H01G 4/248* (2013.01); *H01G 4/30* (2013.01); *H01G 4/1227* (2013.01); *H01G 4/1236* (2013.01)

(58) Field of Classification Search
CPC ........ H01G 4/38; H01G 4/2325; H01G 4/232; H01G 4/30; H01G 4/248; H01G 4/1227; H01G 4/1236; H01G 2/06
See application file for complete search history.

(56) References Cited

U.S. PATENT DOCUMENTS

| 4,158,218 A * | 6/1979 | McLaurin | H01G 2/065 361/306.1 |
|---|---|---|---|
| 6,288,887 B1 * | 9/2001 | Yoshida | H01G 4/232 361/306.1 |
| 6,310,759 B2 * | 10/2001 | Ishigaki | H01G 4/232 361/309 |

(Continued)

FOREIGN PATENT DOCUMENTS

| JP | 11-273984 A | 10/1999 |
|---|---|---|
| JP | 2005-064377 A | 3/2005 |
| JP | 2012-023322 A | 2/2012 |

*Primary Examiner* — Nathan Milakovich
(74) *Attorney, Agent, or Firm* — Keating & Bennett, LLP

(57) ABSTRACT

A multilayer ceramic electronic component includes first and second electronic component bodies and first and second metal terminals. The first and second electronic component bodies are vertically stacked with a gap therebetween. The first metal terminal includes terminal joining portions, a first inter-component extending portion, a first extending portion, and a first mounting portion. The second metal terminal includes terminal joining portions, a second inter-component extending portion, a second extending portion, and a second mounting portion. The first and second inter-component extending portions are disposed in the gap between the first electronic component body and the second electronic component body.

19 Claims, 4 Drawing Sheets

(56) References Cited

U.S. PATENT DOCUMENTS

| | | | | |
|---|---|---|---|---|
| 6,958,899 B2* | 10/2005 | Togashi | ................ | H01G 2/065 |
| | | | | 361/303 |
| 8,233,265 B2* | 7/2012 | Otsuka | ................ | H05K 3/3426 |
| | | | | 361/306.3 |
| 8,570,708 B2* | 10/2013 | Itagaki | .................... | H01G 4/38 |
| | | | | 361/306.3 |
| 9,491,847 B2* | 11/2016 | Park | ...................... | H01G 4/224 |
| 9,947,459 B2* | 4/2018 | Park | ........................ | H01G 4/30 |
| 10,056,320 B2* | 8/2018 | Murrell | ............ | H01L 23/49582 |
| 10,262,801 B2* | 4/2019 | Itamochi | ................ | H01C 7/008 |
| 2005/0041367 A1 | 2/2005 | Yoshii et al. | | |
| 2014/0238578 A1* | 8/2014 | Shimizu | ............... | H01C 17/006 |
| | | | | 156/89.12 |
| 2017/0236643 A1* | 8/2017 | Peuser | ................ | H05K 1/0203 |
| | | | | 257/762 |
| 2018/0122578 A1* | 5/2018 | Choi | ........................ | H01G 2/06 |
| 2019/0122823 A1* | 4/2019 | Cho | .................... | H05K 3/3426 |

* cited by examiner

SECTION ALONG LINE II-II

SECTION ALONG LINE III-III

MULTILAYER CERAMIC ELECTRONIC COMPONENT

CROSS REFERENCE TO RELATED APPLICATIONS

This application claims the benefit of priority to Japanese Patent Application No. 2017-107055 filed on May 30, 2017. The entire contents of this application are hereby incorporated herein by reference.

BACKGROUND OF THE INVENTION

1. Field of the Invention

The present invention relates to a multilayer ceramic electronic component.

2. Description of the Related Art

In recent years, multilayer ceramic capacitors (electronic component bodies), which are ceramic chip electronic components, have come into widespread use. When a multilayer ceramic capacitor is directly soldered onto a mounting board, the mounting board and the multilayer ceramic capacitor mounted thereon expand or contract in response to a temperature change based on their respective thermal expansion coefficients. Accordingly, the difference in thermal expansion coefficient between the mounting board and the multilayer ceramic capacitor causes stress that leads to, for example, damage of the multilayer ceramic capacitor or breakage of a joining portion.

In the case in which the mounting board is composed of a thin glass epoxy substrate or the like that is easily bent, stress is also generated when the mounting board is bent. In addition, stress is also generated when the mounting board is bent and deformed by a force applied thereto. When the generated stress is applied to the multilayer ceramic capacitor, there is a risk that cracks will be formed in the multilayer ceramic capacitor.

To solve the above-described problem, Japanese Unexamined Patent Application Publication No. 2005-64377, for example, proposes a structure in which metal terminals defined by metal plates are attached to outer electrodes of a multilayer ceramic capacitor and soldered onto a mounting board such that the multilayer ceramic capacitor is raised above the mounting board.

According to the above-described method, heat generated during soldering is transferred to the multilayer ceramic capacitor through the metal terminals, so that thermal shock is not easily applied to the multilayer ceramic capacitor. Even when a stress is generated due to a temperature change or when the mounting board is deformed, the stress and deformation of the mounting board is able to be effectively absorbed by elastic deformation of the metal terminals.

However, to increase the capacitance, there has been a demand for a multilayer ceramic capacitor (multilayer ceramic electronic component) including a plurality of multilayer ceramic capacitors that are stacked together and to which metal terminals are attached, as illustrated in FIGS. 4 and 5 of Japanese Unexamined Patent Application Publication No. 2005-64377. The multilayer ceramic electronic component including a plurality of multilayer ceramic capacitors generates heat when in use. As the capacitance of the multilayer ceramic capacitors increases, the heat more readily accumulates in the multilayer ceramic electronic component, and there is a higher risk of thermal runaway. In addition, in recent years, multilayer ceramic capacitors included in car-mounted devices, such as electronic control units (ECUs), have been used in hotter environments. Therefore, the above-described problem may be particularly serious for such a multilayer ceramic capacitor.

SUMMARY OF THE INVENTION

Preferred embodiments of the present invention provide multilayer ceramic electronic components each including a plurality of multilayer ceramic capacitors that are stacked together, and a heat dissipating structure capable of reducing the generation of heat and the occurrence of thermal runaway.

A multilayer ceramic electronic component according to a preferred embodiment of the present invention includes a first electronic component body, a second electronic component body, a first metal terminal, and a second metal terminal. The first electronic component body includes a first multilayer body, a first outer electrode, and a second outer electrode. The first multilayer body includes a plurality of ceramic layers and a plurality of inner electrode layers that are laminated together. The first multilayer body includes a first principal surface and a second principal surface that oppose each other in a lamination direction, a first side surface and a second side surface that oppose each other in a width direction that is orthogonal or substantially orthogonal to the lamination direction, and a first end surface and a second end surface that oppose each other in a length direction that is orthogonal or substantially orthogonal to the lamination direction and the width direction. The first outer electrode is connected to the first end surface of the first multilayer body. The second outer electrode is connected to the second end surface of the first multilayer body. The second electronic component body includes a second multilayer body, a third outer electrode, and a fourth outer electrode. The second multilayer body includes a plurality of ceramic layers and a plurality of inner electrode layers that are laminated together. The second multilayer body includes a third principal surface and a fourth principal surface that oppose each other in the lamination direction, a third side surface and a fourth side surface that oppose each other in the width direction that is orthogonal or substantially orthogonal to the lamination direction, and a third end surface and a fourth end surface that oppose each other in the length direction that is orthogonal or substantially orthogonal to the lamination direction and the width direction. The third outer electrode is connected to the third end surface of the second multilayer body. The fourth outer electrode is connected to the fourth end surface of the second multilayer body. The first metal terminal is connected to the first outer electrode and the third outer electrode. The second metal terminal is connected to the second outer electrode and the fourth outer electrode. The first electronic component body is stacked above the second electronic component body with a gap therebetween so that the second principal surface of the first electronic component body and the third principal surface of the second electronic component body oppose each other. The first metal terminal includes a first terminal joining portion connected to a portion of the first end surface that is adjacent to the first side surface; a second terminal joining portion connected to a portion of the first end surface that is adjacent to the second side surface; a third terminal joining portion connected to the third end surface; a first inter-component extending portion that is disposed between the first terminal joining portion and the second terminal joining portion and that is bent from the third terminal joining portion so as to extend into the gap between the first electronic component body and the second electronic component body; a first extending portion that is connected to the third terminal joining portion and that extends toward a mounting surface so that a gap is provided between the fourth principal surface of the second electronic component body and the mounting surface; and a first mounting portion that is connected to the first extending portion and that extends from the first extending portion in a direction between the first end surface and the second end surface or between the third end surface and the fourth end surface. The second metal terminal includes a fourth terminal joining portion connected to a portion of the second end surface that is adjacent to the first side surface; a fifth terminal joining portion connected to a portion of the second end surface that is adjacent to the second side surface; a sixth terminal joining portion connected to the fourth end surface; a second inter-component extending portion that is disposed between the fourth terminal joining portion and the fifth terminal joining portion and that is bent from the sixth terminal joining portion so as to extend into the gap between the first electronic component body and the second electronic component body; a second extending portion that is connected to the sixth terminal joining portion and that extends toward the mounting surface so that a gap is provided between the fourth principal surface of the second electronic component body and the mounting surface; and a second mounting portion that is connected to the second extending portion and that extends from the second extending portion in the direction between the first end surface and the second end surface or between the third end surface and the fourth end surface.

In a multilayer ceramic electronic component according to a preferred embodiment of the present invention, preferably, a distance between a distal end of the first inter-component extending portion and a distal end of the second inter-component extending portion is in, for example, a range from about 8% to about 33% of a dimension of the first electronic component body or the second electronic component body in the length direction.

In a multilayer ceramic electronic component according to a preferred embodiment of the present invention, preferably, a length of the first inter-component extending portion and the second inter-component extending portion in the width direction, which is a direction between the first side surface and the second side surface or between the third side surface and the fourth side surface, is in, for example, a range from about 20% to about 70% of a length of the first metal terminal and the second metal terminal in the width direction.

In a multilayer ceramic electronic component according to a preferred embodiment of the present invention, preferably, the first inter-component extending portion and the second inter-component extending portion each include one principal surface and another principal surface, the one principal surface of each of the first inter-component extending portion and the second inter-component extending portion being in contact with the second principal surface of the first electronic component body, the other principal surface of each of the first inter-component extending portion and the second inter-component extending portion being in contact with the third principal surface of the second electronic component body.

In a multilayer ceramic electronic component according to a preferred embodiment of the present invention, preferably, the first metal terminal and the second metal terminal each include a base material and a plating layer provided on a surface of the base material, and the base material is Cu.

In a multilayer ceramic electronic component according to a preferred embodiment of the present invention, the first inter-component extending portion and the second inter-component extending portion are provided in the gap between the first electronic component body and the second electronic component body. Accordingly, heat generated by the first electronic component body and the second electronic component body is able to be smoothly dissipated from the first metal terminal and the second metal terminal to the mounting board.

In a multilayer ceramic electronic component according to a preferred embodiment of the present invention, the distance between the distal end of the first inter-component extending portion and the distal end of the second inter-component extending portion may preferably be, for example, in the range from about 8% to about 33% of the dimension of the first electronic component body or the second electronic component body in the length direction. In such a case, the first inter-component extending portion and the second inter-component extending portion are close to the heat source of the multilayer ceramic electronic component. Therefore, a greater amount of heat is able to be transferred to the first metal terminal and the second metal terminal, and the heat dissipating effect is able to be further increased.

In a multilayer ceramic electronic component according to a preferred embodiment of the present invention, the length of the first inter-component extending portion and the second inter-component extending portion in the width direction, which is a direction between the first side surface and the second side surface or between the third side surface and the fourth side surface, may preferably be, for example, in the range from about 20% to about 70% of the length of the first metal terminal and the second metal terminal in the width direction. In such a case, the first inter-component extending portion and the second inter-component extending portion are close to the heat source of the multilayer ceramic electronic component. Therefore, a greater amount of heat is able to be transferred to the first metal terminal and the second metal terminal, and the heat dissipating effect is able to be further increased.

In a multilayer ceramic electronic component according to a preferred embodiment of the present invention, the first inter-component extending portion and the second inter-component extending portion may preferably each include one principal surface and another principal surface, the one principal surface of each of the first inter-component extending portion and the second inter-component extending portion being in contact with the second principal surface of the first electronic component body, the other principal surface of each of the first inter-component extending portion and the second inter-component extending portion being in contact with the third principal surface of the second electronic component body. In such a case, heat generated by the multilayer ceramic electronic component is able to be more smoothly transferred to the first metal terminal and the second metal terminal, and the heat dissipating effect is able to be further increased. In addition, joining materials not only spread over the end surfaces of the multilayer ceramic electronic component but also extend to the front and back surfaces thereof. Accordingly, the fixing force between each of the first electronic component body and the second electronic component body and each of the first metal terminal and the second metal terminal increases, and the first electronic component body and the second electronic component body is able to be positioned in a stable manner.

In a multilayer ceramic electronic component according to a preferred embodiment of the present invention, the first metal terminal and the second metal terminal may preferably each include a base material and a plating layer provided on the surface of the base material. When the base material is Cu, which has a low electrical resistance and high thermal conductivity, the amount of heat generated and thermal resistance is able to be reduced. Accordingly, the occurrence of thermal runaway is able to be reduced.

Preferred embodiments of the present invention provide multilayer ceramic electronic components each including a plurality of multilayer ceramic capacitors that are stacked together and having a heat dissipating structure capable of reducing the generation of heat and the occurrence of thermal runaway.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
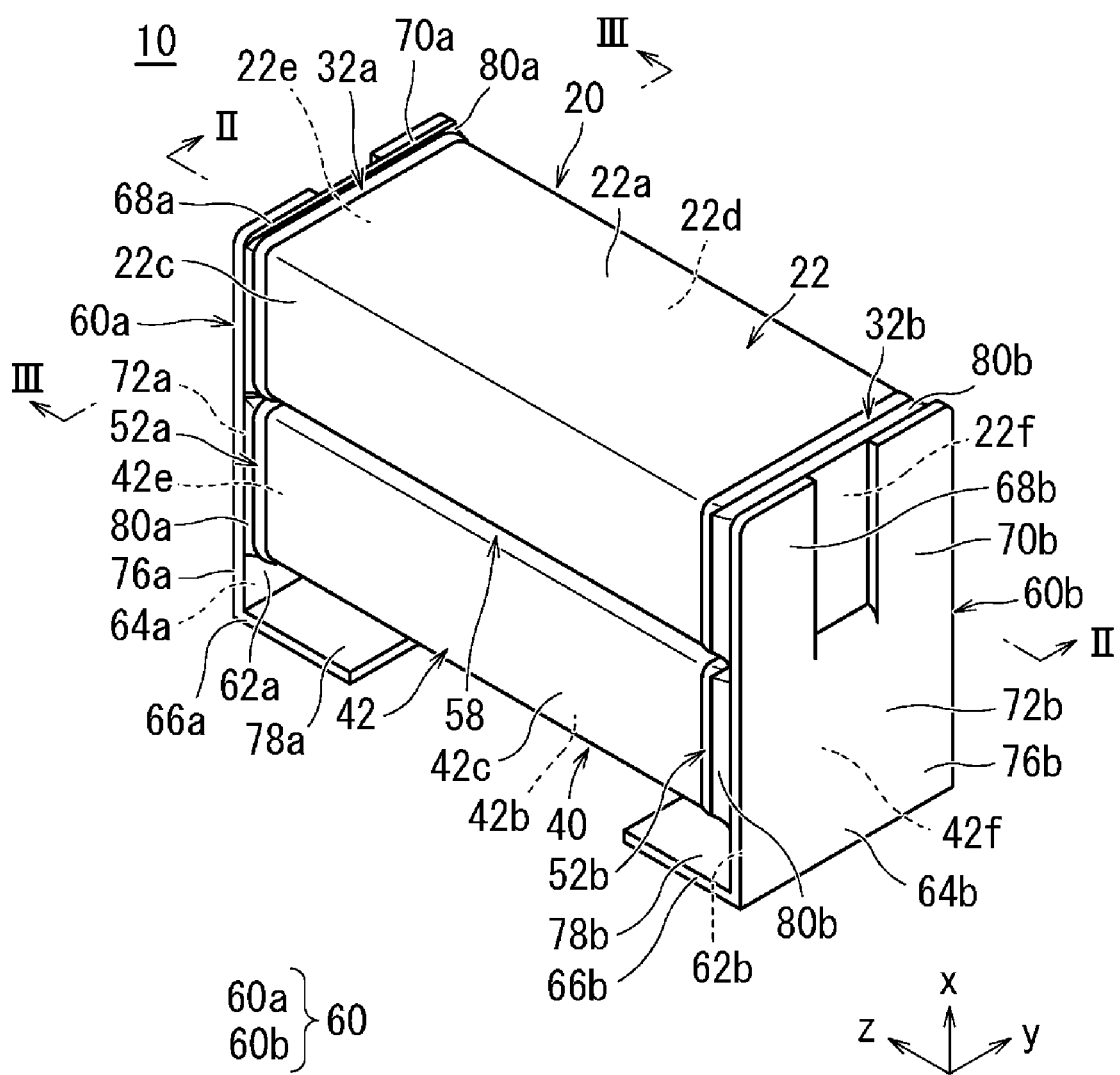
FIG. 1 is a perspective view illustrating an example of a multilayer ceramic electronic component according to a preferred embodiment of the present invention.
Figure 2:
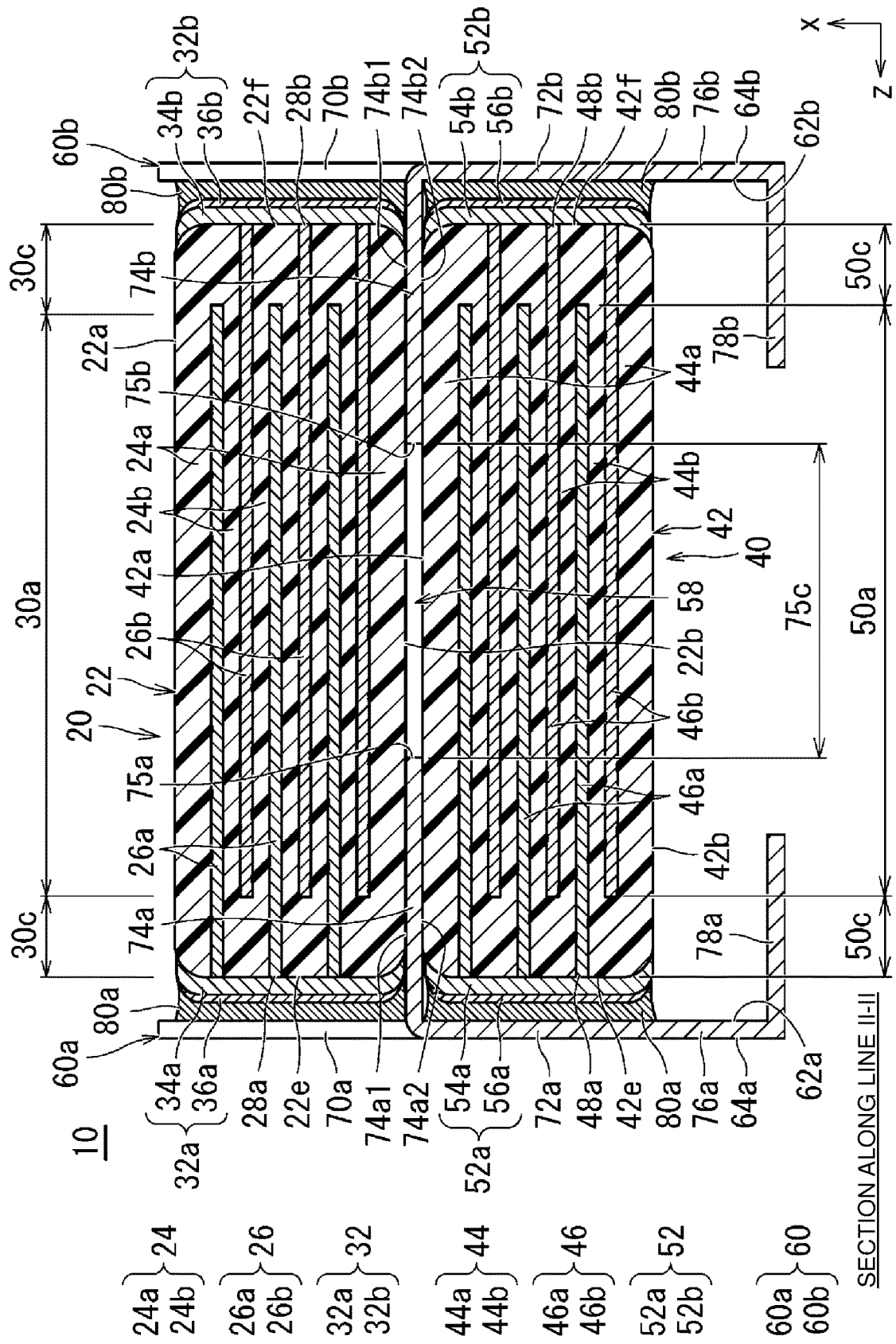
FIG. 2 is a sectional view of the multilayer ceramic electronic component according to the preferred embodiment of the present invention illustrated in FIG. 1, taken along line II-II.
Figure 3:
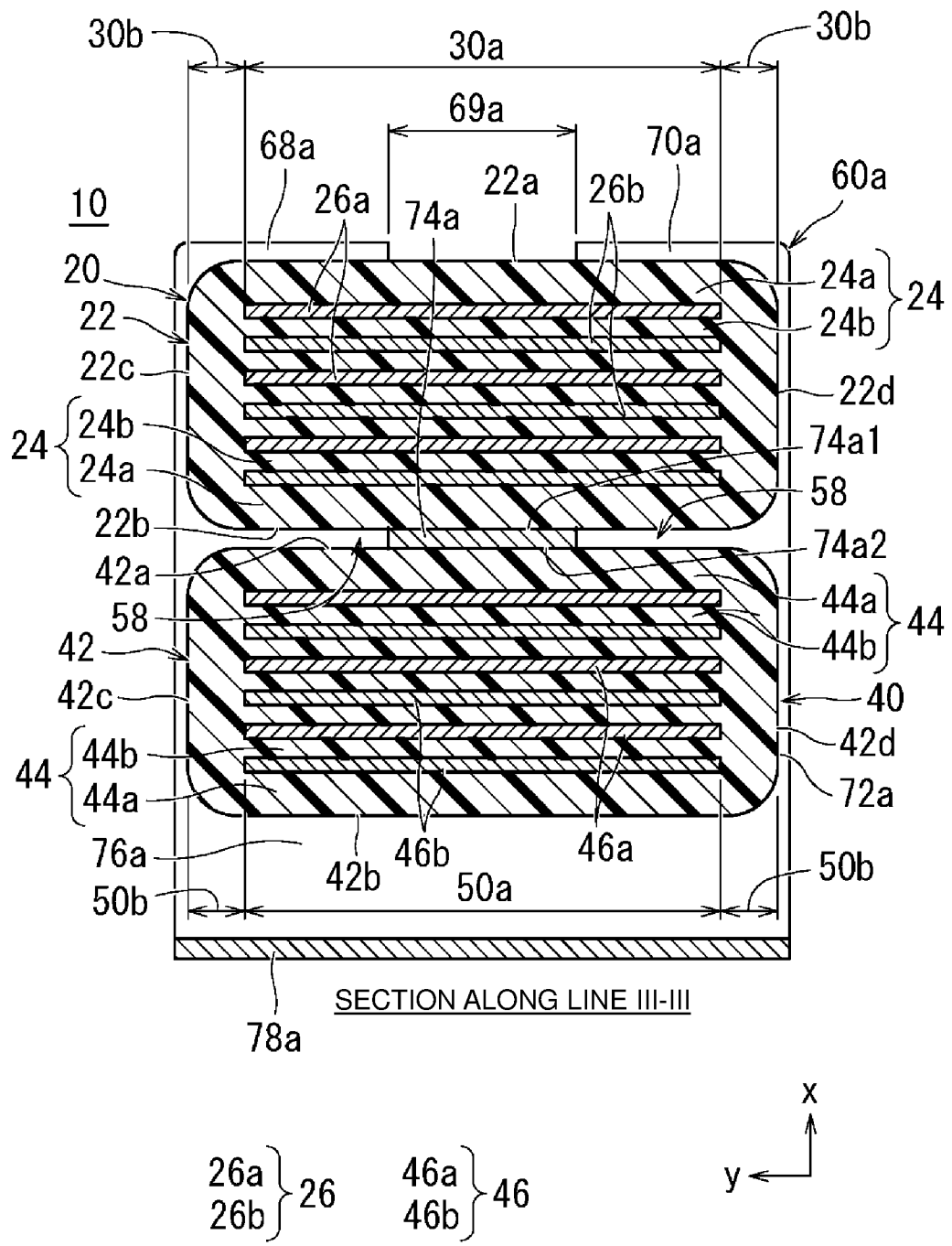
FIG. 3 is a sectional view of the multilayer ceramic electronic component according to the preferred embodiment of the present invention illustrated in FIG. 1, taken along line III-III.
Figure 4A:
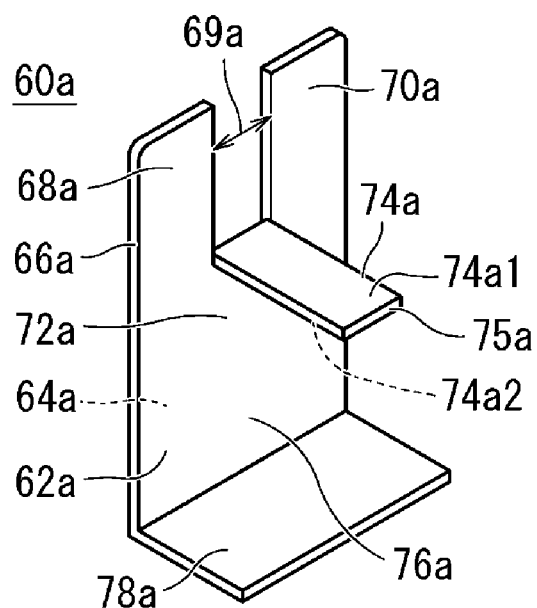
FIG. 4A is a perspective view of a first metal terminal included in a multilayer ceramic electronic component according to a preferred embodiment of the present invention.
Figure 4B:
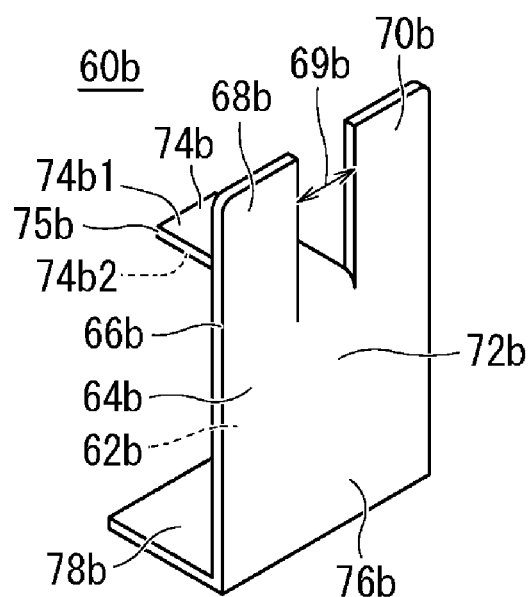
FIG. 4B is a perspective view of a second metal terminal included in a multilayer ceramic electronic component according to a preferred embodiment of the present invention.

Multilayer ceramic electronic components according to preferred embodiments of the present invention will now be described with reference to the drawings. FIG. 1 is a perspective view illustrating an example of a multilayer ceramic electronic component according to a preferred embodiment of the present invention. FIG. 2 is a sectional view of the multilayer ceramic electronic component according to the preferred embodiment of the present invention illustrated in FIG. 1, taken along line II-II. FIG. 3 is a sectional view of the multilayer ceramic electronic component according to the preferred embodiment of the present invention illustrated in FIG. 1, taken along line III-III. FIG. 4A is a perspective view of a first metal terminal included in a multilayer ceramic electronic component according to a preferred embodiment of the present invention. FIG. 4B is a perspective view of a second metal terminal included in a multilayer ceramic electronic component according to a preferred embodiment of the present invention.

As illustrated in FIGS. 1 and 2, the multilayer ceramic electronic component 10 includes, for example, a first electronic component body 20, a second electronic component body 40, and metal terminals 60. The metal terminals 60 include a first metal terminal 60a and a second metal terminal 60b. The first electronic component body 20 and the second electronic component body 40 are vertically stacked with a gap 58 therebetween. The first electronic component body 20 and the second electronic component body 40 are connected to the first metal terminal 60a by a first joining material 80a. The first electronic component body 20 and the second electronic component body 40 are connected to the second metal terminal 60b by a second joining material 80b. The multilayer ceramic electronic component according to the present preferred embodiment may include three or more electronic component bodies, instead of two electronic component bodies.

The first electronic component body 20 preferably includes a rectangular or substantially rectangular-parallelepiped-shaped first multilayer body 22.

The first multilayer body 22 includes a plurality of ceramic layers 24 and a plurality of inner electrode layers 26 that are laminated together. The multilayer body 22 includes a first principal surface 22a and a second principal surface 22b that oppose each other in a lamination direction x; a first side surface 22c and a second side surface 22d that oppose each other in a width direction y that is orthogonal or substantially orthogonal to the lamination direction x; and a first end surface 22e and a second end surface 22f that oppose each other in a length direction z that is orthogonal or substantially orthogonal to the lamination direction x and the width direction y. The first principal surface 22a and the second principal surface 22b of the first multilayer body 22 are parallel or substantially parallel to a surface on which the multilayer ceramic electronic component 10 is mounted (mounting surface). Corners and ridges of the first multilayer body 22 are preferably rounded. The corners are portions at which three surfaces of the multilayer body intersect, and the ridges are portions at which two surfaces of the multilayer body that are adjacent to each other intersect.

The ceramic layers 24 include outer layers 24a and inner layers 24b. The outer layers 24a are adjacent to the first principal surface 22a and the second principal surface 22b of the first multilayer body 22, and include the ceramic layer 24 disposed between the first principal surface 22a and the inner electrode layer 26 closest to the first principal surface 22a, and the ceramic layer 24 disposed between the second principal surface 22b and the inner electrode layer 26 closest to the second principal surface 22b. The inner layers 24b are the ceramic layers 24 disposed between the outer layers 24a.

The ceramic layers 24 may preferably be made of, for example, a dielectric material. The dielectric material may be, for example, a dielectric ceramic including $BaTiO_3$, $CaTiO_3$, $SrTiO_3$, $CaZrO_3$, or other suitable dielectric materials. In the case in which the dielectric material is included as the main component, a Mn compound, a Fe compound, a Cr compound, a Co compound, or a Ni compound, for example, may preferably be additionally included in accordance with the desired characteristics of the electronic component body 20, the content thereof being less than that of the main component.

When a piezoelectric ceramic material is used for the first multilayer body 22, the first electronic component body 20 defines and functions as a ceramic piezoelectric element.

The piezoelectric ceramic material may preferably be, for example, a lead zirconate titanate (PZT) based ceramic material.

When a semiconductor ceramic material is used for the first multilayer body 22, the first electronic component body 20 functions as a thermistor element. The semiconductor ceramic material may preferably be, for example, a spinel-based ceramic material.

When a magnetic ceramic material is used for the first multilayer body 22, the first electronic component body 20 functions as an inductor element. When the first electronic component body 20 defines and functions as an inductor element, the inner electrode layers 26 define a coil-shaped conductor. The magnetic ceramic material may preferably be, for example, a ferrite ceramic material.

The thickness of the ceramic layers 24 after the firing process is preferably in the range from about 0.5 μm to about 10 μm, for example.

As illustrated in FIG. 2, the inner electrode layers 26 of the first multilayer body 22 include, for example, a plurality of rectangular or substantially rectangular first inner electrode layers 26a and a plurality of rectangular or substantially rectangular second inner electrode layers 26b. The first inner electrode layers 26a and the second inner electrode layers 26b are embedded so as to be alternately arranged at equal or substantially equal intervals in the lamination direction x of the first multilayer body 22.

The first inner electrode layers 26a and the second inner electrode layers 26b include electrode surfaces that extend perpendicular or substantially perpendicular to the direction in which the metal terminals 60 extend and parallel or substantially parallel to the mounting surface. The first inner electrode layers 26a and the second inner electrode layers 26b may instead extend perpendicular or substantially perpendicular to the mounting surface.

Each first inner electrode layer 26a includes a first extended electrode portion 28a that is extended to the first end surface 22e of the first multilayer body 22 at one end thereof. Each second inner electrode layer 26b includes a second extended electrode portion 28b that is extended to the second end surface 22f of the first multilayer body 22 at one end thereof. More specifically, the first extended electrode portion 28a at the one end of each first inner electrode layer 26a is exposed at the first end surface 22e of the first multilayer body 22. The second extended electrode portion 28b at the one end of each second inner electrode layer 26b is exposed at the second end surface 22f of the first multilayer body 22.

The first multilayer body 22 includes counter electrode portions 30a in which the first inner electrode layers 26a and the second inner electrode layers 26b oppose each other with the inner layers 24b included in the ceramic layers 24 interposed therebetween. The first multilayer body 22 also includes side portions (hereinafter referred to as "W gaps") 30b, which are provided between the first side surface 22c and one end of each counter electrode portion 30a in the width direction y and between the second side surface 22d and the other end of each counter electrode portion 30a in the width direction y. The first multilayer body 22 also includes end portions (hereinafter referred to as "L gaps") 30c, which are provided between the second end surface 22f and an end portion of each first inner electrode layer 26a at the end opposite to the first extended electrode portion 28a and between the first end surface 22e and an end portion of each second inner electrode layer 26b at the end opposite to the second extended electrode portion 28b.

The inner electrode layers 26 preferably include a metal, such as Ni, Cu, Ag, Pd, or Au, or an alloy of these metals, such as a Ag—Pd alloy, for example. The inner electrode layers 26 may additionally include dielectric particles having the same type of composition as that of the ceramic included in the ceramic layers 24.

The thickness of the inner electrode layers 26 is preferably in the range from about 0.1 μm to about 2 μm, for example.

Outer electrodes 32 are disposed at the first end surface 22e and the second end surface 22f of the first multilayer body 22. The outer electrodes 32 include a first outer electrode 32a and a second outer electrode 32b.

The first outer electrode 32a is disposed only at the first end surface 22e of the first multilayer body 22. The first outer electrode 32a covers the first end surface 22e of the first multilayer body 22. In this case, the first outer electrode 32a is electrically connected to the first extended electrode portions 28a of the first inner electrode layers 26a.

The second outer electrode 32b is disposed only at the second end surface 22f of the first multilayer body 22. The second outer electrode 32b covers the second end surface 22f of the first multilayer body 22. In this case, the second outer electrode 32b is electrically connected to the second extended electrode portions 28b of the second inner electrode layers 26b.

In each counter electrode portion 30a of the first multilayer body 22, one of the first inner electrode layers 26a and one of the second inner electrode layers 26b oppose each other with one of the ceramic layers 24 interposed therebetween to provide an electrostatic capacitance. Thus, an electrostatic capacitance is provided between the first outer electrode 32a to which the first inner electrode layers 26a are connected and the second outer electrode 32b to which the second inner electrode layers 26b are connected. Therefore, the electronic component body having the above-described structure functions as a capacitor element.

As illustrated in FIG. 2, the first outer electrode 32a includes a first underlying electrode layer 34a and a first plating layer 36a provided on the surface of the first underlying electrode layer 34a in that order from the first multilayer body 22. Similarly, the second outer electrode 32b includes a second underlying electrode layer 34b and a second plating layer 36b provided on the surface of the second underlying electrode layer 34b in that order from the first multilayer body 22.

The first underlying electrode layer 34a and the second underlying electrode layer 34b (hereinafter also referred to simply as underlying electrode layers) each preferably include at least one of a baked layer, a resin layer, and a thin film layer, for example. An example in which the underlying electrode layers each include a baked layer will be described herein.

The baked layer preferably includes a glass and a metal, for example. The glass in the baked layer includes, for example, B, Si, Ba, Mg, Al, or Li. The metal in the baked layer includes, for example, at least one of Cu, Ni, Ag, Pd, Ag—Pd alloy, and Au. The baked layer may include a plurality of layers. The baked layer is formed by applying a conductive paste including the glass and metal to the first multilayer body 22 and baking the conductive paste. The conductive paste may be fired together with the ceramic layers 24 and the inner electrode layers 26, or may be baked after the ceramic layers 24 and the inner electrode layers 26 are fired. The thickness of the thickest portion of the baked layer is preferably in the range from about 10 μm to about 50 μm, for example.

A resin layer including conductive particles and a thermosetting resin may preferably be provided on the surface of the baked layer. The resin layer may instead be provided directly on the first multilayer body 22 without the baked layer provided therebetween. The resin layer may include a plurality of layers. The thickness of the thickest portion of the resin layer is preferably in the range from about 10 µm to about 150 µm, for example.

The thin film layer is preferably formed by a thin film formation method, such as sputtering or vapor deposition, and is formed of metal particles deposited to a thickness of about 1 µm or less, for example.

The first plating layer 36a and the second plating layer 36b (hereinafter also referred to simply as plating layers) are preferably made of, for example, at least one metal selected from Cu, Ni, Sn, Ag, Pd, Ag—Pd alloy, Au, or an alloy of these metals.

Each plating layer may include a plurality of layers. In such a case, each plating layer preferably has a two-layer structure including a Ni plating layer and a Sn plating layer, for example. The Ni plating layer is provided to cover the surface of the underlying electrode layer and to thus prevent erosion of the underlying electrode layer by the solder used to join the first metal terminal 60a and the second metal terminal 60b. The Sn plating layer is provided on the surface of the Ni plating layer to facilitate the mounting process by improving wettability for the solder used to mount the multilayer ceramic capacitor.

The thickness of each plating layer is preferably in the range from about 1 µm to about 15 µm, for example. The plating layers preferably include no glass. The amount of metal included in the plating layers per unit volume is preferably greater than or equal to about 99% by volume, for example. The plating layers are formed by grain growth in the thickness direction, and are column shaped.

The plating layers may be provided directly on the surfaces of the first multilayer body 22 without the first underlying electrode layer 34a and the second underlying electrode layer 34b provided therebetween. When the plating layers are provided directly on the surfaces of the first multilayer body 22, the plating layers preferably include, for example, at least one metal selected from Cu, Ni, Sn, Pb, Au, Ag, Pd, Bi, and Zn or an alloy of these metals.

The second electronic component body 40 preferably includes a rectangular or substantially rectangular-parallelepiped-shaped second multilayer body 42.

The second multilayer body 42 includes a plurality of ceramic layers 44 and a plurality of inner electrode layers 46 that are laminated together. The multilayer body 42 includes a third principal surface 42a and a fourth principal surface 42b that oppose each other in the lamination direction x; a third side surface 42c and a fourth side surface 42d that oppose each other in the width direction y that is orthogonal or substantially orthogonal to the lamination direction x; and a third end surface 42e and a fourth end surface 42f that oppose each other in the length direction z that is orthogonal or substantially orthogonal to the lamination direction x and the width direction y. The third principal surface 42a and the fourth principal surface 42b of the second multilayer body 42 are parallel or substantially parallel to the surface on which the multilayer ceramic electronic component 10 is mounted (mounting surface). Corners and ridges of the second multilayer body 42 are preferably rounded. The corners are portions at which three surfaces of the multilayer body intersect, and the ridges are portions at which two surfaces of the multilayer body that are adjacent to each other intersect.

The ceramic layers 44 include outer layers 44a and inner layers 44b. The outer layers 44a are adjacent to the third principal surface 42a and the fourth principal surface 42b of the second multilayer body 42, and include the ceramic layer 44 disposed between the third principal surface 42a and the inner electrode layer 46 closest to the third principal surface 42a, and the ceramic layer 44 disposed between the fourth principal surface 42b and the inner electrode layer 46 closest to the fourth principal surface 42b. The inner layers 44b are the ceramic layers 44 disposed between the outer layers 44a.

The ceramic layers 44 are preferably made of, for example, the same dielectric material as that of the ceramic layers 24, and description thereof is thus omitted.

When a piezoelectric ceramic material is used for the second multilayer body 42, the second electronic component body 40 defines and functions as a ceramic piezoelectric element. The piezoelectric ceramic material may preferably be, for example, a lead zirconate titanate (PZT) based ceramic material.

When a semiconductor ceramic material is used or the second multilayer body 42, the second electronic component body 40 defines and functions as a thermistor element. The semiconductor ceramic material may preferably be, for example, a spinel-based ceramic material.

When a magnetic ceramic material is used for the second multilayer body 42, the second electronic component body 40 functions as an inductor element. When the second electronic component body 40 defines and functions as an inductor element, the inner electrode layers 46 define a coil-shaped conductor. The magnetic ceramic material may preferably be, for example, a ferrite ceramic material.

The thickness of the ceramic layers 44 after the firing process is preferably in the range from about 0.5 µm to about 10 µm, for example.

As illustrated in FIG. 2, the inner electrode layers 46 of the second multilayer body 42 include, for example, a plurality of rectangular or substantially rectangular third inner electrode layers 46a and a plurality of rectangular or substantially rectangular fourth inner electrode layers 46b. The third inner electrode layers 46a and the fourth inner electrode layers 46b are embedded so as to be alternately arranged at equal or substantially equal intervals in the lamination direction x of the second multilayer body 42.

The third inner electrode layers 46a and the fourth inner electrode layers 46b include electrode surfaces that extend perpendicular or substantially perpendicular to the direction in which the metal terminals 60 extend and parallel or substantially parallel to the mounting surface. The third inner electrode layers 46a and the fourth inner electrode layers 46b may instead extend perpendicular or substantially perpendicular to the mounting surface.

Each third inner electrode layer 46a includes a third extended electrode portion 48a that is extended to the third end surface 42e of the second multilayer body 42 at one end thereof. Each fourth inner electrode layer 46b includes a fourth extended electrode portion 48b that is extended to the fourth end surface 42f of the second multilayer body 42 at one end thereof. More specifically, the third extended electrode portion 48a at the one end of each third inner electrode layer 46a is exposed at the third end surface 42e of the second multilayer body 42. The fourth extended electrode portion 48b at the one end of each fourth inner electrode layer 46b is exposed at the fourth end surface 42f of the second multilayer body 42.

The second multilayer body 42 includes counter electrode portions 50a in which the third inner electrode layers 46a and the fourth inner electrode layers 46b oppose each other with the inner layers 44*b* included in the ceramic layers 44 interposed therebetween. The second multilayer body 42 also includes side portions (hereinafter referred to as "W gaps") 50*b*, which are provided between the third side surface 42*c* and one end of each counter electrode portion 50*a* in the width direction y and between the fourth side surface 42*d* and the other end of each counter electrode portion 50*a* in the width direction y. The second multilayer body 42 also includes end portions (hereinafter referred to as "L gaps") 50*c*, which are provided between the fourth end surface 42*f* and an end portion of each third inner electrode layer 46*a* at the end opposite to the third extended electrode portion 48*a* and between the third end surface 42*e* and an end portion of each fourth inner electrode layer 46*b* at the end opposite to the fourth extended electrode portion 48*b*.

The inner electrode layers 46 preferably include, for example, the same material as that included in the inner electrode layers 26, and description thereof is thus omitted.

The thickness of the inner electrode layers 46 is preferably in the range from about 0.1 μm to about 2 μm, for example.

Outer electrodes 52 are disposed at the third end surface 42*e* and the fourth end surface 42*f* of the second multilayer body 42. The outer electrodes 52 include a third outer electrode 52*a* and a second outer electrode 52*b*.

The third outer electrode 52*a* is disposed only at the third end surface 42*e* of the second multilayer body 42. The third outer electrode 52*a* covers the third end surface 42*e* of the second multilayer body 42. In this case, the third outer electrode 52*a* is electrically connected to the third extended electrode portions 48*a* of the third inner electrode layers 46*a*.

The fourth outer electrode 52*b* is disposed only at the fourth end surface 42*f* of the second multilayer body 42. The fourth outer electrode 52*b* covers the fourth end surface 42*f* of the second multilayer body 42. In this case, the fourth outer electrode 52*b* is electrically connected to the fourth extended electrode portions 48*b* of the fourth inner electrode layers 46*b*.

In each counter electrode portion 50*a* of the second multilayer body 42, one of the third inner electrode layers 46*a* and one of the fourth inner electrode layers 46*b* oppose each other with one of the ceramic layers 44 interposed therebetween to provide an electrostatic capacitance. Thus, an electrostatic capacitance is provided between the third outer electrode 52*a* to which the third inner electrode layers 46*a* are connected and the fourth outer electrode 52*b* to which the fourth inner electrode layers 46*b* are connected. Therefore, the electronic component body having the above-described structure defines and functions as a capacitor element.

As illustrated in FIG. 2, the third outer electrode 52*a* includes a third underlying electrode layer 54*a* and a third plating layer 56*a* provided on the surface of the third underlying electrode layer 54*a* in that order from the second multilayer body 42. Similarly, the fourth outer electrode 52*b* includes a fourth underlying electrode layer 54*b* and a fourth plating layer 56*b* provided on the surface of the fourth underlying electrode layer 54*b* in that order from the second multilayer body 42.

The third underlying electrode layer 54*a* and the fourth underlying electrode layer 54*b* each include at least one of a baked layer, a resin layer, and a thin film layer. The materials and structures of the third underlying electrode layer 54*a* and the fourth underlying electrode layer 54*b* are the same or substantially the same as those of the first underlying electrode layer 34*a* and the second underlying electrode layer 34*b*, and description thereof is thus omitted.

The materials and structures of the third plating layer 56*a* and the fourth plating layer 56*b* are also the same or substantially the same as those of the first plating layer 36*a* and the second plating layer 36*b*, and description thereof is thus omitted.

The metal terminals 60 include the first metal terminal 60*a* and the second metal terminal 60*b*.

The metal terminals 60 are used to mount the multilayer ceramic electronic component 10 on the mounting board.

The first metal terminal 60*a* is defined by, for example, a plate-shaped lead frame. The first metal terminal 60*a* includes one principal surface 62*a* that is connected to the first outer electrode 32*a* and the third outer electrode 52*a*; another principal surface 64*a* that opposes the one principal surface 62*a*; and a peripheral surface 66*a* that defines the thickness between the one principal surface 62*a* and the other principal surface 64*a*. The first metal terminal 60*a* preferably has an L-shaped cross section, for example.

Similarly, the second metal terminal 60*b* is defined by, for example, a plate-shaped lead frame. The second metal terminal 60*b* includes one principal surface 62*b* that is connected to the second outer electrode 32*b* and the fourth outer electrode 52*b*; another principal surface 64*b* that opposes the one principal surface 62*b*; and a peripheral surface 66*b* that defines the thickness between the one principal surface 62*b* and the other principal surface 64*b*. The second metal terminal 60*b* preferably has an L-shaped cross section, for example.

When the first metal terminal 60*a* and the second metal terminal 60*b* are L-shaped in cross section, resistance of the multilayer ceramic electronic component 10 mounted on the mounting board against bending of the mounting board is increased.

The first metal terminal 60*a* is connected to the first outer electrode 32*a* of the first electronic component body 20 and the third outer electrode 52*a* of the second electronic component body 40 by the first joining material 80*a*.

The second metal terminal 60*b* is connected to the second outer electrode 32*b* of the first electronic component body 20 and the fourth outer electrode 52*b* of the second electronic component body 40 by the second joining material 80*b*.

The first metal terminal 60*a* includes a first terminal joining portion 68*a* connected to a portion of the first end surface 22*e* of the first multilayer body 22 that is adjacent to the first side surface 22*c*; a second terminal joining portion 70*a* connected to a portion of the first end surface 22*e* of the first multilayer body 22 that is adjacent to the second side surface 22*d*; a third terminal joining portion 72*a* connected to the third end surface 42*e* of the second multilayer body 42; a first inter-component extending portion 74*a* that is disposed between the first terminal joining portion 68*a* and the second terminal joining portion 70*a* and that is bent from the third terminal joining portion 72*a* so as to extend into the gap 58 between the first electronic component body 20 and the second electronic component body 40; a first extending portion 76*a* that is connected to the third terminal joining portion 72*a* and that extends toward the mounting surface so that a gap is provided between the fourth principal surface 42*b* of the second electronic component body 40 and the mounting surface; and a first mounting portion 78*a* that is connected to the first extending portion 76*a* and that extends from the first extending portion 76*a* in a direction between the first end surface 22e and the second end surface 22f or between the third end surface 42e and the fourth end surface 42f.

The second metal terminal 60b includes a fourth terminal joining portion 68b connected to a portion of the second end surface 22f of the first multilayer body 22 that is adjacent to the first side surface 22c; a fifth terminal joining portion 70b connected to a portion of the second end surface 22f of the first multilayer body 22 that is adjacent to the second side surface 22d; a sixth terminal joining portion 72b connected to the fourth end surface 42f of the second multilayer body 42; a second inter-component extending portion 74b that is disposed between the fourth terminal joining portion 68b and the fifth terminal joining portion 70b and that is bent from the sixth terminal joining portion 72b so as to extend into the gap 58 between the first electronic component body 20 and the second electronic component body 40; a second extending portion 76b that is connected to the sixth terminal joining portion 72b and that extends toward the mounting surface so that a gap is provided between the fourth principal surface 42b of the second electronic component body 40 and the mounting surface; and a second mounting portion 78b that is connected to the second extending portion 76b and that extends from the second extending portion 76b in the direction between the first end surface 22e and the second end surface 22f or between the third end surface 42e and the fourth end surface 42f.

The first terminal joining portion 68a of the first metal terminal 60a is connected to a portion of the first outer electrode 32a on the portion of the first end surface 22e of the first multilayer body 22 that is adjacent to the first side surface 22c by the first joining material 80a, and is preferably rectangular or substantially rectangular.

The second terminal joining portion 70a of the first metal terminal 60a is connected to a portion of the first outer electrode 32a on the portion of the first end surface 22e of the first multilayer body 22 that is adjacent to the second side surface 22d by the first joining material 80a, and is preferably rectangular or substantially rectangular.

The third terminal joining portion 72a of the first metal terminal 60a is connected to the third outer electrode 52a on the third end surface 42e of the second multilayer body 42 by the first joining material 80a, and is preferably rectangular or substantially rectangular.

The size of a joining-portion gap 69a, which is the gap between the first terminal joining portion 68a and the second terminal joining portion 70a of the first metal terminal 60a, is preferably in the range, for example, from about 20% to about 70% of the size of the first metal terminal 60a in the width direction y. When the size of the joining-portion gap 69a between the first terminal joining portion 68a and the second terminal joining portion 70a of the first metal terminal 60a is less than about 20%, the size of the first inter-component extending portion 74a in the width direction y is small. Therefore, the contact area in which the first inter-component extending portion 74a is in contact with the first electronic component body 20 and the second electronic component body 40 is also small, and a sufficient heat dissipating effect is not able to be obtained. As the size of the joining-portion gap 69a decreases beyond about 20%, the heat dissipating effect gradually decreases. When the size of the joining-portion gap 69a between the first terminal joining portion 68a and the second terminal joining portion 70a of the first metal terminal 60a is greater than about 70%, the contact area between the first electronic component body 20 and the first metal terminal 60a, in particular, is small and, therefore, sufficient fixing force is not able to be obtained. As the size of the joining-portion gap 69a increases beyond about 70%, the fixing force gradually decreases.

The fourth terminal joining portion 68b of the second metal terminal 60b is connected to a portion of the second outer electrode 32b on the portion of the second end surface 22f of the first multilayer body 22 that is adjacent to the first side surface 22c by the second joining material 80b, and is preferably rectangular or substantially rectangular.

The fifth terminal joining portion 70b of the second metal terminal 60b is connected to a portion of the second outer electrode 32b on the portion of the second end surface 22f of the first multilayer body 22 that is adjacent to the second side surface 22d by the second joining material 80b, and is preferably rectangular or substantially rectangular.

The sixth terminal joining portion 72b of the second metal terminal 60b is connected to the fourth outer electrode 52b on the fourth end surface 42f of the second multilayer body 42 by the second joining material 80b, and is preferably rectangular or substantially rectangular.

The size of a joining-portion gap 69b, which is the gap between the fourth terminal joining portion 68b and the fifth terminal joining portion 70b of the second metal terminal 60b, is preferably in the range, for example, from about 20% to about 70% of the size of the second metal terminal 60b in the width direction y. When the size of the joining-portion gap 69b between the fourth terminal joining portion 68b and the fifth terminal joining portion 70b of the second metal terminal 60b is less than about 20%, the size of the second inter-component extending portion 74b in the width direction y is small. Therefore, the contact area in which the second inter-component extending portion 74b is in contact with the first electronic component body 20 and the second electronic component body 40 is also small, and a sufficient heat dissipating effect is not able to be obtained. As the size of the joining-portion gap 69b decreases beyond about 20%, the heat dissipating effect gradually decreases. When the size of the joining-portion gap 69b between the fourth terminal joining portion 68b and the fifth terminal joining portion 70b of the second metal terminal 60b is greater than about 70%, the contact area between the first electronic component body 20 and the second metal terminal 60b, in particular, is small and, therefore, sufficient fixing force is not able to be obtained. As the size of the joining-portion gap 69b increases beyond about 70%, the fixing force gradually decreases.

A rib portion may extend from the first terminal joining portion 68a to the third terminal joining portion 72a of the first metal terminal 60a and oppose the first side surface 22c of the first electronic component body 20 and the third side surface 42c of the second electronic component body 40. Another rib portion may extend from the second terminal joining portion 70a to the third terminal joining portion 72a of the first metal terminal 60a and oppose the second side surface 22d of the first electronic component body 20 and the fourth side surface 42d of the second electronic component body 40.

A rib portion may extend from the fourth terminal joining portion 68b to the sixth terminal joining portion 72b of the second metal terminal 60b and oppose the first side surface 22c of the first electronic component body 20 and the third side surface 42c of the second electronic component body 40. Another rib portion may extend from the fifth terminal joining portion 70b to the sixth terminal joining portion 72b of the second metal terminal 60b and oppose the second side surface 22d of the first electronic component body 20 and the fourth side surface 42d of the second electronic component body 40.

When the rib portions are provided, the rigidities of the first terminal joining portion 68a, the second terminal joining portion 70a, and the third terminal joining portion 72a of the first metal terminal 60a are able to be increased. Similarly, the rigidities of the fourth terminal joining portion 68b, the fifth terminal joining portion 70b, and the sixth terminal joining portion 72b of the second metal terminal 60b are able to be increased. Accordingly, the terminal joining portions are not easily deformed when, for example, the multilayer ceramic electronic component 10 receives a load in the length direction z.

In addition, the joining area in which the first outer electrode 32a is joined to the first terminal joining portion 68a and the second terminal joining portion 70a of the first metal terminal 60a and the joining area in which the third outer electrode 52a is joined to the third terminal joining portion 72a of the first metal terminal 60a is able to be increased. Similarly, the joining area in which the second outer electrode 32b is joined to the fourth terminal joining portion 68b and the fifth terminal joining portion 70b of the second metal terminal 60b and the joining area in which the fourth outer electrode 52b is joined to the sixth terminal joining portion 72b of the second metal terminal 60b is able to be increased. As a result, the risk of separation is reduced.

The first inter-component extending portion 74a of the first metal terminal 60a is disposed between the first terminal joining portion 68a and the second terminal joining portion 70a and is bent from one end of the third terminal joining portion 72a so as to extend into the gap 58 between the first electronic component body 20 and the second electronic component body 40.

The second inter-component extending portion 74b of the second metal terminal 60b is disposed between the fourth terminal joining portion 68b and the fifth terminal joining portion 70b and is bent from one end of the sixth terminal joining portion 72b so as to extend into the gap 58 between the first electronic component body 20 and the second electronic component body 40.

The length of a distal-end gap 75c, which is a gap between a distal end 75a (other end) of the first inter-component extending portion 74a and a distal end 75b (other end) of the second inter-component extending portion 74b, is preferably in the range, for example, from about 8% to about 33% of the dimension of the first electronic component body 20 or the second electronic component body 40 in the length direction z. When the length of the distal-end gap 75c is less than about 8%, there is a risk that a discharge will occur between the first metal terminal 60a and the second metal terminal 60b. When the length of the distal-end gap 75c is greater than about 33%, the distance from the heat source increases, and therefore, there is a risk that a sufficient heat dissipating effect is not able to be obtained. As the length of the distal-end gap 75c increases beyond about 33%, the heat dissipating effect gradually decreases.

The length of the first inter-component extending portion 74a and the second inter-component extending portion 74b in the width direction y, which is a direction between the first side surface 22c and the second side surface 22d or between the third side surface 42c and the fourth side surface 42d, is preferably in the range, for example, from about 20% to about 70% of the length of the first metal terminal 60a and the second metal terminal 60b in the width direction y. When the length of the first inter-component extending portion 74a and the second inter-component extending portion 74b in the width direction y is less than about 20%, the size of the first inter-component extending portion 74a and the second inter-component extending portion 74b in the width direction y is small. Therefore, the contact areas in which the first electronic component body 20 and the second electronic component body 40 are in contact with the first inter-component extending portion 74a and the second inter-component extending portion 74b are also small, and sufficient heat dissipating effect is not able to be obtained. As the length of the first inter-component extending portion 74a and the second inter-component extending portion 74b in the width direction y decreases beyond about 20%, the heat dissipating effect decreases. When the length of the first inter-component extending portion 74a and the second inter-component extending portion 74b in the width direction y is greater than about 70%, the contact areas in which the first electronic component body 20 is in contact with the first metal terminal 60a and the second metal terminal 60b are small, and therefore sufficient fixing force is not able to be obtained. As the length of the first inter-component extending portion 74a and the second inter-component extending portion 74b in the width direction y increases beyond about 70%, the fixing force gradually decreases.

Preferably, the first inter-component extending portion 74a and the second inter-component extending portion 74b are in contact with the first electronic component body 20 and the second electronic component body 40.

The first inter-component extending portion 74a includes one principal surface 74a1 and another principal surface 74a2. Preferably, the one principal surface 74a1 of the first inter-component extending portion 74a is in contact with the second principal surface 22b of the first multilayer body 22, and the other principal surface 74a2 of the first inter-component extending portion 74a is in contact with the third principal surface 42a of the second multilayer body 42.

The second inter-component extending portion 74b includes one principal surface 74b1 and another principal surface 74b2. Preferably, the one principal surface 74b1 of the second inter-component extending portion 74b is in contact with the second principal surface 22b of the first multilayer body 22, and the other principal surface 74b2 of the second inter-component extending portion 74b is in contact with the third principal surface 42a of the second multilayer body 42.

The thickness of the first inter-component extending portion 74a and the second inter-component extending portion 74b is not particularly limited, but is preferably in the range from about 0.1 mm to about 0.5 mm, for example, and is preferably as large as possible. In such a case, a large amount of heat generated by the multilayer ceramic electronic component 10 is able to be transferred to the metal terminals 60, and the heat dissipating performance is improved.

One end of the first extending portion 76a of the first metal terminal 60a is connected to the other end of the third terminal joining portion 72a. The first extending portion 76a extends toward the mounting surface to provide a gap between the fourth principal surface 42b of the second electronic component body 40 and the mounting surface. In other words, the first extending portion 76a of the first metal terminal 60a is provided to space the first electronic component body 20 and the second electronic component body 40 of the multilayer ceramic electronic component 10 away from the mounting board on which the multilayer ceramic electronic component 10 is mounted.

One end of the second extending portion 76b of the second metal terminal 60b is connected to the other end of the sixth terminal joining portion 72b. The second extending portion 76b extends toward the mounting surface to provide a gap between the fourth principal surface 42b of the second electronic component body 40 and the mounting surface. In other words, the second extending portion 76b of the second metal terminal 60b is provided to space the first electronic component body 20 and the second electronic component body 40 of the multilayer ceramic electronic component 10 away from the mounting board on which the multilayer ceramic electronic component 10 is mounted.

The first extending portion 76a of the first metal terminal 60a and the second extending portion 76b of the second metal terminal 60b absorb mechanical strains generated in the ceramic layers 24 and 44 by elastic deformations of the first metal terminal 60a and the second metal terminal 60b when an alternating voltage is applied. Accordingly, vibration generated at this time is not easily transmitted to the mounting board through the outer electrodes 32 and 52. As a result, noise is able to be reduced.

The first extending portion 76a of the first metal terminal 60a is, for example, rectangular or substantially rectangular-plate-shaped, and extends from the other end of the third terminal joining portion 72a towards the mounting surface in a height direction, which is orthogonal or substantially orthogonal to the second principal surface 42b of the second multilayer body 42. The first extending portion 76a and the third terminal joining portion 72a extend along the same or substantially the same plane.

The second extending portion 76b of the second metal terminal 60b is, for example, rectangular or substantially rectangular-plate-shaped, and extends from the other end of the sixth terminal joining portion 72b towards the mounting surface in the height direction, which is orthogonal or substantially orthogonal to the second principal surface 42b of the second multilayer body 42. The second extending portion 76b and the sixth terminal joining portion 72b extend along the same or substantially the same plane.

One end of the first mounting portion 78a of the first metal terminal 60a is connected to the other end of the first extending portion 76a of the first metal terminal 60a. The first mounting portion 78a extends from the first extending portion 76a in the direction between the first end surface 22e and the second end surface 22f or between the third end surface 42e and the fourth end surface 42f.

One end of the second mounting portion 78b of the second metal terminal 60b is connected to the other end of the second extending portion 76b of the second metal terminal 60b. The second mounting portion 78b extends from the second extending portion 76b in the direction between the first end surface 22e and the second end surface 22f or between the third end surface 42e and the fourth end surface 42f.

The first mounting portion 78a of the first metal terminal 60a extends from the other end of the first extending portion 76a of the first metal terminal 60a in the length direction z that is parallel or substantially parallel to the fourth principal surface 42b, and is bent at a right angle from the first extending portion 76a of the first metal terminal 60a.

The second mounting portion 78b of the second metal terminal 60b extends from the other end of the second extending portion 76b of the second metal terminal 60b in the length direction z that is parallel or substantially parallel to the fourth principal surface 42b, and is bent at a right angle from the second extending portion 76b of the second metal terminal 60b.

The first mounting portion 78a and the second mounting portion 78b may be bent either towards or away from the first electronic component body 20 and the second electronic component body 40.

The length of the first mounting portion 78a of the first metal terminal 60a in the length direction z (direction between the end surfaces of the first multilayer body or the second multilayer body) may be longer than the length of the first extending portion 76a of the first metal terminal 60a in the lamination direction x (direction between the principal surfaces of the first multilayer body or the second multilayer body). The corner between the first extending portion 76a and the first mounting portion 78a of the first metal terminal 60a may be rounded.

The length of the second mounting portion 78b of the second metal terminal 60b in the length direction z (direction between the end surfaces of the first multilayer body or the second multilayer body) may be longer than the length of the second extending portion 76b of the second metal terminal 60b in the lamination direction x (direction between the principal surfaces of the first multilayer body or the second multilayer body). The corner between the second extending portion 76b and the second mounting portion 78b of the second metal terminal 60b may be rounded.

Each metal terminal 60 includes a terminal body and a plating film provided on the surface of the terminal body.

The terminal body is preferably made of, for example, Ni, Fe, Cu, Ag, Cr, or an alloy including one or more of these metals as the main component thereof. More preferably, the terminal body is made of, for example, Ni, Fe, Cr, or an alloy including one or more of these metals as the main component thereof. For example, the metal used as the base material of the terminal body may be Fe-42Ni alloy or Fe-18Cr alloy. The thickness of the terminal body of each metal terminal 60 is preferably in the range from about 0.05 mm to about 0.5 mm, for example. When the terminal body is made of a high-melting-point metal, such as Ni, Fe, Cr or an alloy including one or more of these metals as the main component thereof, the heat resistance of the outer electrodes 32 and 52 is able to be increased.

The plating film may be provided over the entire or substantially the entire surface of each metal terminal 60.

The peripheral surface 66a of the first extending portion 76a and the first mounting portion 78a of the first metal terminal 60a may have no plating film provided thereon. Also, the peripheral surface 66b of the second extending portion 76b and the second mounting portion 78b of the second metal terminal 60b may have no plating film provided thereon. In such a case, when the multilayer ceramic electronic component 10 is soldered onto the mounting board, solder wicking along each metal terminal 60 is able to be reduced. Accordingly, the solder does not easily flow into the gaps (clearances) between the second electronic component body 40 and the metal terminals 60, so that the clearances are prevented from being filled with the solder. Thus, a sufficiently large space is provided in each clearance. Therefore, the first extending portion 76a of the first metal terminal 60a and the second extending portion 76b of the second metal terminal 60b are able to be easily elastically deformed, so that mechanical strains in the ceramic layers 24 and 44 generated when an alternating voltage is applied are readily absorbed. Accordingly, vibration generated at this time is not easily transmitted to the mounting board through the outer electrodes 32 and 52. Thus, by providing the metal terminals 60, acoustic noise is more reliably reduced.

When the plating film is to be removed from the peripheral surface 66a of the first extending portion 76a and the first mounting portion 78a of the first metal terminal 60a and the peripheral surface 66b of the second extending portion 76b and the second mounting portion 78b of the second metal terminal 60b, or from the entire peripheral surface 66a of the first metal terminal 60a and the entire peripheral surface 66b of the second metal terminal 60b, the plating film may be removed, for example, mechanically (by cutting or grinding), by laser trimming, or by using a plating release agent (for example, sodium hydroxide). When, for example, no plating film is to be provided on the first extending portion 76a and the first mounting portion 78a of the first metal terminal 60a and the second extending portion 76b and the second mounting portion 78b of the second metal terminal 60b, portions on which no plating film is to be provided may be covered with a resist in advance, and then the plating film may be provided on the remaining portions of the first metal terminal 60a and the second metal terminal 60b. Then, the resist is removed.

The plating film preferably includes, for example, a lower plating film and an upper plating film.

The lower plating film is provided on the surface of the terminal body, and the upper plating film is provided on the surface of the lower plating film.

The lower plating film is preferably made of Ni, Fe, Cu, Ag, Cr, or an alloy including one or more of these metals as the main component thereof, for example. More preferably, the lower plating film is made of Ni, Fe, Cr, or an alloy including one or more of these metals as the main component thereof, for example. When the lower plating film is made of a high-melting-point metal, such as Ni, Fe, Cr or an alloy including one or more of these metals as the main component thereof, the heat resistance of the outer electrodes 32 and 52 is able to be increased. The thickness of the lower plating film is preferably in the range from about 0.2 μm to about 5.0 μm, for example. The lower plating film may include a plurality of plating films.

The upper plating film is preferably made of Sn, Ag, Au or an alloy including one or more of these metals as the main component thereof, for example. More preferably, the upper plating film is made of Sn or an alloy including Sn as the main component thereof, for example. When the upper plating film is made of Sn or an alloy including Sn as the main component thereof, solderability of the metal terminals 60 and the outer electrodes 32 and 52 is able to be increased. The thickness of the upper plating film is preferably in the range from about 1.0 μm to about 5.0 μm, for example. The upper plating film may include a plurality of layers.

When the plating film has a single-layer structure, a highly solderable upper plating film is preferably provided.

The first joining material 80a joins the first outer electrode 32a of the first electronic component body 20 to the first terminal joining portion 68a and the second terminal joining portion 70a of the first metal terminal 60a and joins the third outer electrode 52a of the second electronic component body 40 to the third terminal joining portion 72a of the first metal terminal 60a.

The second joining material 80b joins the second outer electrode 32b of the first electronic component body 20 to the fourth terminal joining portion 68b and the fifth terminal joining portion 70b of the second metal terminal 60b and joins the fourth outer electrode 52b of the second electronic component body 40 to the sixth terminal joining portion 72b of the second metal terminal 60b.

A lead free (LF) solder, such as Sn—Sb based, Sn—Ag—Cu based, Sn—Cu based, or Sn—Bi based solder, for example, may be used as the first joining material 80a and the second joining material 80b. In particular, when Sn—Sb based solder is used, the content of Sb is preferably in the range from about 5% to about 15%, for example.

A preferred embodiment of a method for manufacturing a multilayer ceramic electronic component having the above-described structure will now be described. Here, a method for manufacturing the multilayer ceramic electronic component 10 illustrated in FIG. 1 will be described as an example.

A method for manufacturing the first electronic component body 20 according to a preferred embodiment of the present invention will now be described as an example of a method for manufacturing an electronic component body. The method for manufacturing the first electronic component body 20 described below is the same or substantially the same as a method for manufacturing the second electronic component body 40.

First, ceramic green sheets, inner electrode conductive paste used to form the inner electrode layers 26, and outer electrode conductive paste used to form the outer electrodes 32 are prepared. The ceramic green sheets, the inner electrode conductive paste, and the outer electrode conductive paste include organic binders and solvents, which may be commonly known organic binders and solvents.

The inner electrode conductive paste is applied to the ceramic green sheets in predetermined patterns, for example, so that inner electrode patterns are formed on the ceramic green sheets. The inner electrode conductive paste may be applied to the ceramic green sheets by a known method, such as screen printing for example.

Next, a mother multilayer body is formed by stacking a predetermined number of outer-layer ceramic green sheets on which no inner electrode patterns are formed, the ceramic green sheets on which the inner electrode patterns are formed, and a predetermined number of outer-layer ceramic green sheets in that order. The mother multilayer body may be pressure-bonded in the lamination direction as necessary by, for example, isostatic pressing.

After that, raw multilayer body chips are obtained by cutting the mother multilayer body into predetermined shapes. The corners and ridges of the raw multilayer body chips may be rounded by, for example, barrel finishing. Next, multilayer bodies are obtained by firing the raw multilayer body chips. The firing temperature for the raw multilayer body chips depends on the ceramic material and the material of the inner electrode conductive paste, and is preferably in the range from about 900° C. to about 1300° C., for example.

Next, the outer electrode conductive paste is applied to both end surfaces of each of the fired multilayer bodies, and then the multilayer bodies are baked. Thus, the first underlying electrode layer 34a of the first outer electrode 32a and the second underlying electrode layer 34b of the second outer electrode 32b are formed. The baking temperature is preferably in the range from about 700° C. to about 900° C., for example.

Then, the first plating layer 36a is formed on the surface of the first underlying electrode layer 34a, and the second plating layer 36b is formed on the surface of the second underlying electrode layer 34b as necessary.

The first electronic component body 20 and the second electronic component body 40 are manufactured by the above-described method.

A step of attaching metal terminals in the method for manufacturing the multilayer ceramic electronic component according to the present preferred embodiment will now be described.

First, the desired first metal terminal 60a and the desired second metal terminal 60b are prepared.

Next, the prepared first metal terminal 60a is attached to the first outer electrode 32a of the first electronic component body 20 and the third outer electrode 52a of the second electronic component body 40 using the first joining material 80a. Similarly, the prepared second metal terminal 60b is attached to the second outer electrode 32b of the first electronic component body 20 and the fourth outer electrode 52b of the second electronic component body 40 using the second joining material 80b. The first metal terminal 60a and the second metal terminal 60b are attached by setting the reflow soldering temperature of the first joining material 80a and the second joining material 80b preferably to a temperature in the range from about 270° C. to about 290° C., and applying the required heat for about 30 minutes or more, for example.

The multilayer ceramic electronic component 10 illustrated in FIG. 1 is manufactured by the above-described method.

In the multilayer ceramic electronic component 10 illustrated in FIG. 1, the first inter-component extending portion 74a and the second inter-component extending portion 74b are provided in the gap 58 between the first electronic component body 20 and the second electronic component body 40. Accordingly, heat generated by the first electronic component body 20 and the second electronic component body 40 is able to be smoothly dissipated from the metal terminals 60 to the mounting board.

In addition, in the multilayer ceramic electronic component 10 illustrated in FIG. 1, the length of the distal-end gap 75c between the distal end 75a of the first inter-component extending portion 74a and the distal end 75b of the second inter-component extending portion 74b may preferably be in the range from about 8% to about 33%, for example, of the dimension of the first electronic component body 20 or the second electronic component body 40 in the length direction z. In such a case, the first inter-component extending portion 74a and the second inter-component extending portion 74b are close to the heat source of the multilayer ceramic electronic component 10. Therefore, a greater amount of heat is able to be transferred to the metal terminals 60, and the heat dissipating effect is further increased.

In the multilayer ceramic electronic component 10 illustrated in FIG. 1, the length of the first inter-component extending portion 74a and the second inter-component extending portion 74b in the width direction y, which is a direction between the first side surface 22c and the second side surface 22d or between the third side surface 42c and the fourth side surface 42d, may preferably be in the range from about 20% to about 70%, for example of the length of the first metal terminal 60a and the second metal terminal 60b in the width direction y. In such a case, the first inter-component extending portion 74a and the second inter-component extending portion 74b are close to the heat source of the multilayer ceramic electronic component 10. Therefore, a greater amount of heat is able to be transferred to the metal terminals 60, and the heat dissipating effect is further increased.

In addition, in the multilayer ceramic electronic component 10 illustrated in FIG. 1, the first inter-component extending portion 74a includes one principal surface 74a1 and another principal surface 74a2. The one principal surface 74a1 of the first inter-component extending portion 74a may be in contact with the second principal surface 22b of the first multilayer body 22, and the other principal surface 74a2 of the first inter-component extending portion 74a may be in contact with the third principal surface 42a of the second multilayer body 42. Similarly, the second inter-component extending portion 74b includes one principal surface 74b1 and another principal surface 74b2. The one principal surface 74b1 of the second inter-component extending portion 74b may be in contact with the second principal surface 22b of the first multilayer body 22, and the other principal surface 74b2 of the second inter-component extending portion 74b may be in contact with the third principal surface 42a of the second multilayer body 42. In such a case, heat generated by the multilayer ceramic electronic component 10 is able to be more smoothly transferred to the metal terminals 60, and the heat dissipating effect is further increased. In addition, the first joining material 80a and the second joining material 80b not only spread over the end surfaces of the multilayer ceramic electronic component 10 but also extend to the front and back surfaces thereof. Accordingly, the fixing force between each of the first electronic component body 20 and the second electronic component body 40 and each of the metal terminals 60 increases, and the first electronic component body 20 and the second electronic component body 40 are able to be positioned in a stable manner.

The first metal terminal 60a and the second metal terminal 60b may each preferably include a base material and a plating layer provided on the surface of the base material. When the base material is Cu, which has a low electrical resistance and high thermal conductivity, the amount of heat generated and thermal resistance is able to be reduced. Accordingly, the occurrence of thermal runaway is able to be reduced.

The present invention is not limited to the above-described preferred embodiments, and various modifications are possible within the scope thereof. The thickness and number of ceramic layers, the area in which the electrodes oppose each other, and outer dimensions of the electronic component bodies are also not limited.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component comprising:
   a first electronic component body including:
   a first multilayer body including a plurality of first ceramic layers and a plurality of first inner electrode layers that are laminated together, the first multilayer body including a first principal surface and a second principal surface that oppose each other in a lamination direction, a first side surface and a second side surface that oppose each other in a width direction that is orthogonal or substantially orthogonal to the lamination direction, and a first end surface and a second end surface that oppose each other in a length direction that is orthogonal or substantially orthogonal to the lamination direction and the width direction;
   a first outer electrode connected to the first end surface of the first multilayer body; and
   a second outer electrode connected to the second end surface of the first multilayer body;
   a second electronic component body including:
   a second multilayer body including a plurality of second ceramic layers and a plurality of second inner electrode layers that are laminated together, the second multilayer body including a third principal surface and a fourth principal surface that oppose each other in the lamination direction, a third side surface and a fourth side surface that oppose each other in the width direction that is orthogonal or substantially orthogonal to the lamination direction, and a third end surface and a fourth end surface that oppose each other in the length direction that is orthogonal or substantially orthogonal to the lamination direction and the width direction;

a third outer electrode connected to the third end surface of the second multilayer body; and a fourth outer electrode connected to the fourth end surface of the second multilayer body;

a first metal terminal connected to the first outer electrode and the third outer electrode; and a second metal terminal connected to the second outer electrode and the fourth outer electrode; wherein the first electronic component body is stacked above the second electronic component body with a gap therebetween so that the second principal surface of the first electronic component body and the third principal surface of the second electronic component body oppose each other;

the first metal terminal includes:
- a first terminal joining portion connected to a portion of the first end surface that is adjacent to the first side surface;
- a second terminal joining portion connected to a portion of the first end surface that is adjacent to the second side surface;
- a third terminal joining portion connected to the third end surface;
- a first inter-component extending portion that is disposed between the first terminal joining portion and the second terminal joining portion and that is bent from the third terminal joining portion so as to extend into the gap between the first electronic component body and the second electronic component body;
- a first extending portion that is connected to the third terminal joining portion and that extends toward a mounting surface so that a gap is at least partially provided between the fourth principal surface of the second electronic component body and the mounting surface; and
- a first mounting portion that is connected to the first extending portion and that extends from the first extending portion in a direction connecting between the first end surface and the second end surface or between the third end surface and the fourth end surface; and the second metal terminal includes:
- a fourth terminal joining portion connected to a portion of the second end surface that is adjacent to the first side surface;
- a fifth terminal joining portion connected to a portion of the second end surface that is adjacent to the second side surface;
- a sixth terminal joining portion connected to the fourth end surface;
- a second inter-component extending portion that is disposed between the fourth terminal joining portion and the fifth terminal joining portion and that is bent from the sixth terminal joining portion so as to extend into the gap between the first electronic component body and the second electronic component body;
- a second extending portion that is connected to the sixth terminal joining portion and that extends toward the mounting surface so that the gap is at least partially provided between the fourth principal surface of the second electronic component body and the mounting surface; and
- a second mounting portion that is connected to the second extending portion and that extends from the second extending portion in the direction connecting between the first end surface and the second end surface or between the third end surface and the fourth end surface;

the first inter-component extending portion and the second inter-component extending portion each include one principal surface and another principal surface;

the one principal surface of each of the first inter-component extending portion and the second inter-component extending portion is in contact with the second principal surface of the first electronic component body;

the another principal surface of each of the first inter-component extending portion and the second inter-component extending portion is in contact with the third principal surface of the second electronic component body;

an area of the third terminal joining portion of the first metal terminal that is connected to the third end surface is greater than an area of the first and second terminal joining portions of the first metal terminal that are connected to the first end surface; and an area of the sixth terminal joining portion of the second metal terminal that is connected to the fourth end surface is greater than an area of the fourth and fifth terminal portions of the second metal terminal that are connected to the second end surface.

2. The multilayer ceramic electronic component according to claim 1, wherein a distance between a distal end of the first inter-component extending portion and a distal end of the second inter-component extending portion is in a range from about 8% to about 33% of a dimension of the first electronic component body or the second electronic component body in the length direction.

3. The multilayer ceramic electronic component according to claim 1, wherein a length of the first inter-component extending portion and the second inter-component extending portion in the width direction, which is a direction connecting between the first side surface and the second side surface or between the third side surface and the fourth side surface, is in a range from about 20% to about 70% of a length of the first metal terminal and the second metal terminal in the width direction.

4. The multilayer ceramic electronic component according to claim 1, wherein the first metal terminal and the second metal terminal each include a base material and a plating layer provided on a surface of the base material, and the base material is Cu.

5. The multilayer ceramic electronic component according to claim 1, wherein each of the plurality of first and second ceramic layers is made of a dielectric material.

6. The multilayer ceramic electronic component according to claim 5, wherein the dielectric material is a dielectric ceramic including $BaTiO_3$, $CaTiO_3$, $SrTiO_3$, or $CaZrO_3$.

7. The multilayer ceramic electronic component according to claim 6, wherein the dielectric ceramic further includes a Mn compound, a Fe compound, a Cr compound, a Co compound, or a Ni compound, a content thereof being less than that of the $BaTiO_3$, $CaTiO_3$, $SrTiO_3$, or $CaZrO_3$.

8. The multilayer ceramic electronic component according to claim 1, wherein a thickness of each of the plurality of first and second ceramic layers is in a range from about 0.5 μm to about 10 μm.

9. The multilayer ceramic electronic component according to claim 1, wherein each of the plurality of first and second inner electrode layers include Ni, Cu, Ag, Pd, or Au, or an alloy including Cu, Ag, Pd, or Au.

10. The multilayer ceramic electronic component according to claim 1, wherein a thickness of each of the plurality of first and second inner electrode layers is in a range from about 0.1 µm to about 2 µm.

11. The multilayer ceramic electronic component according to claim 1, wherein the first outer electrode is disposed only at the first end surface of the first multilayer body.

12. The multilayer ceramic electronic component according to claim 1, wherein the second outer electrode is disposed only at the second end surface of the first multilayer body.

13. The multilayer ceramic electronic component according to claim 1, wherein
the first outer electrode includes a first underlying electrode layer and a first plating layer provided on a surface of the first underlying electrode layer; and
the second outer electrode includes a second underlying electrode layer and a second plating layer provided on a surface of the second underlying electrode layer.

14. The multilayer ceramic electronic component according to claim 13, wherein the first and second underlying electrode layers each include at least one of a baked layer, a resin layer, and a thin film layer.

15. The multilayer ceramic electronic component according to claim 13, wherein the first and second underlying electrode layers each include a baked layer.

16. The multilayer ceramic electronic component according to claim 15, wherein each of the baked layers includes a glass and a metal.

17. The multilayer ceramic electronic component according to claim 16, wherein the glass includes at least one of B, Si, Ba, Mg, Al, and Li.

18. The multilayer ceramic electronic component according to claim 16, wherein the metal includes at least one of Cu, Ni, Ag, Pd, Ag—Pd alloy, and Au.

19. The multilayer ceramic electronic component according to claim 15, wherein a thickness of each of the baked layers is in a range of about 10 µm to about 50 µm.

* * * * *